S. B. CHAPMAN.
Car-Wheel.
No. 160,814 — Patented March 16, 1875.
Fig: 1.
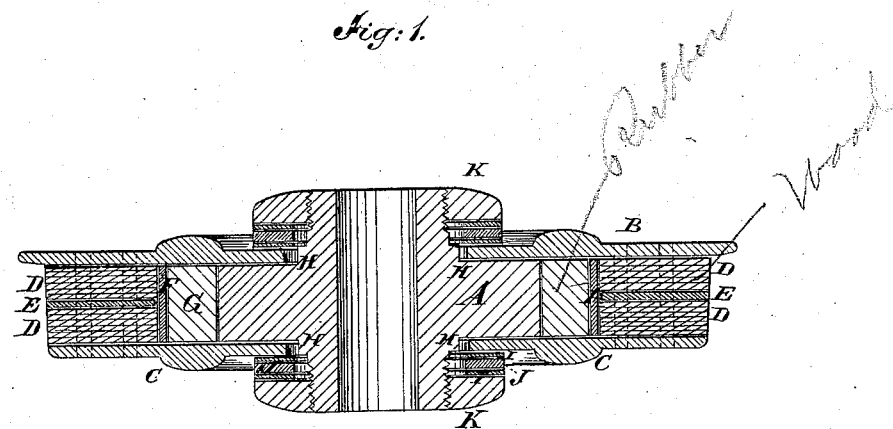
Fig: 2.
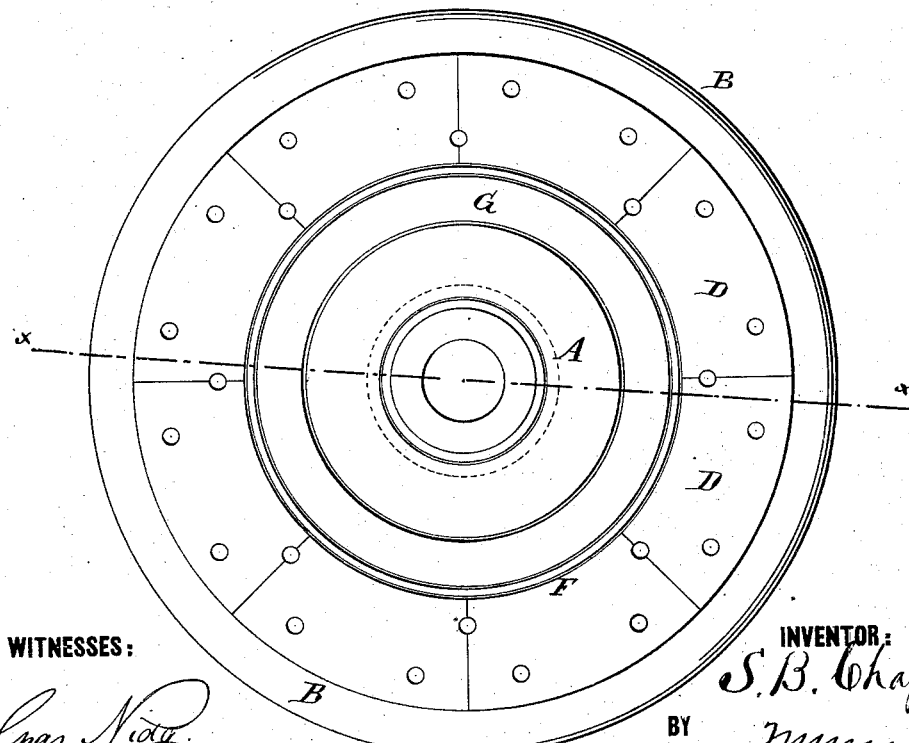
WITNESSES:
INVENTOR:
S. B. Chapman
BY
ATTORNEYS.

UNITED STATES PATENT OFFICE.

SAMUEL BALDWIN CHAPMAN, OF NEW YORK, N. Y.

IMPROVEMENT IN CAR-WHEELS.

Specification forming part of Letters Patent No. 160,814, dated March 16, 1875; application filed February 13, 1875.

*To all whom it may concern:*

Be it known that I, SAMUEL B. CHAPMAN, of the city, county, and State of New York, have invented a new and useful Improvement in Flexible Car-Wheels, of which the following is a specification:

Letters Patent of the United States No. 75,521, bearing date March 17, 1868, were granted to me for improvements in car-wheels. There were certain defects in the invention described in said Letters Patent which I have corrected in the present application.

The invention will first be fully described, and then pointed out in the claims.

Figure 1 is a section of the wheel, taken on the line $x\,x$ of Fig. 2. Fig. 2 is a side view, showing the wheel with the outside plate removed.

Similar letters of reference indicate corresponding parts.

A is the hub of the wheel. B is the inside flange-plate. C is the outside plate. D is the wooden tread, confined by bolts between the two plates B C, as seen in the drawing. This wooden tread is made by gluing or otherwise fastening together pieces of veneering placed obliquely to each other, and oblique to the wheel, so that the exterior surface of the sections which form the tread will be endwise of the grain, and then turned off outside and in. This tread is made in two sections, having between the sections a steel ring, E. This ring may be a trifle less in diameter than the wood, so that the latter, by the time it gets worn to the diameter of the ring, will have become hardened, so that, with the bearing of the ring on the rail, it will resist the wear, while affording a much greater degree of traction than can be obtained from an entire metallic tread. F is a metallic band, which surrounds the heavy rubber ring G. This rubber surrounds the hub. It is broad and thick, and affords a great amount of flexibility to the wheel. H denotes spaces within the plates B C, which allow the tread and the plates, which are firmly bolted together, to play toward the axle from the point of contact with the rail. The rubber ring G acts as a cushion to give the wheel flexibility, and to relieve the rolling-stock of the concussions and constant jarring sensation so disagreeable to passengers on railroads. The flexibility of the wheel adds materially to the durability of the rolling-stock, as well as of the rails. I represents metallic plates on the sides of the wheel, between which plates are rings of rubber J. K K are nuts, which screw onto the ends of the hub, and onto the outer plates I, as seen in Fig. 1.

It will be perceived that the band F takes the strain of the separate wooden sections D and of the intermediate plate E, distributing it uniformly upon the rubber G, and thus preserving the outer surface or perimeter of these parts even and in their proper relative position.

What I claim is—

1. The combination of metallic ring E, with wooden sections D D, substantially as and for the purpose set forth.

2. The combination of metallic band F, with sectional tread D E D and rubber ring G, substantially as and for the purpose set forth.

SAMUEL BALDWIN CHAPMAN.

Witnesses:
T. B. MOSHER,
ALEX. F. ROBERTS.